United States Patent Office 3,326,579
Patented June 20, 1967

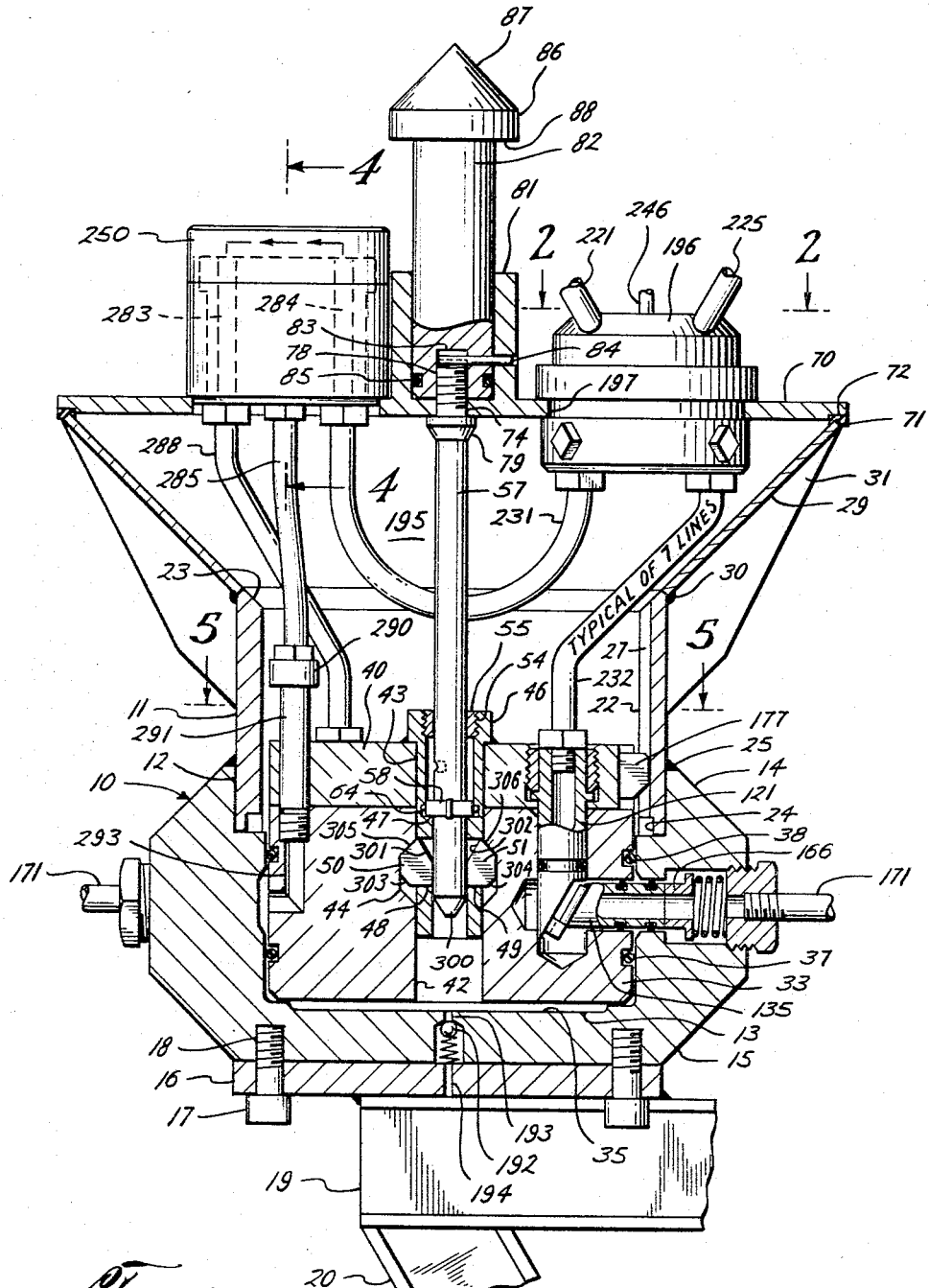

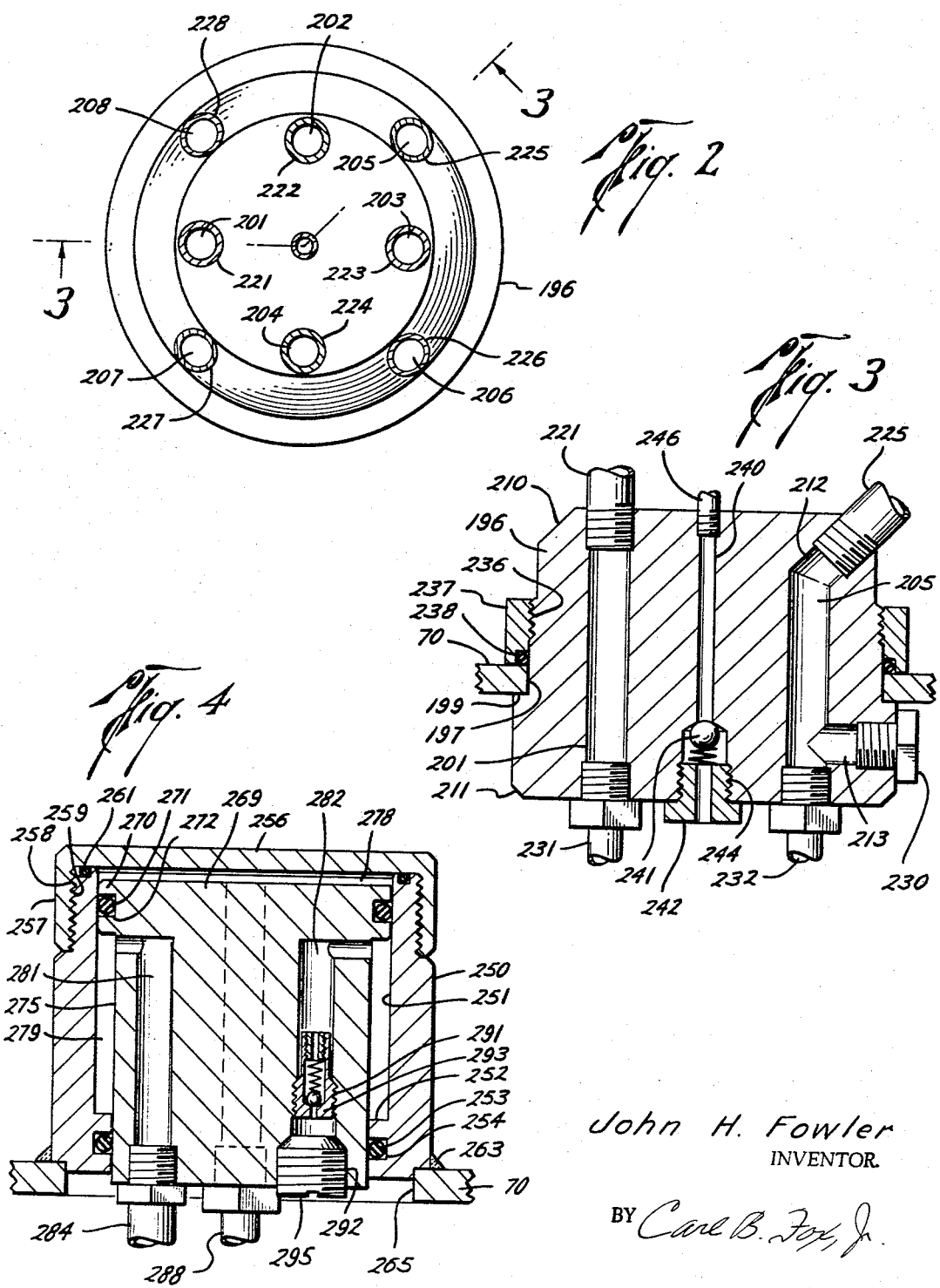

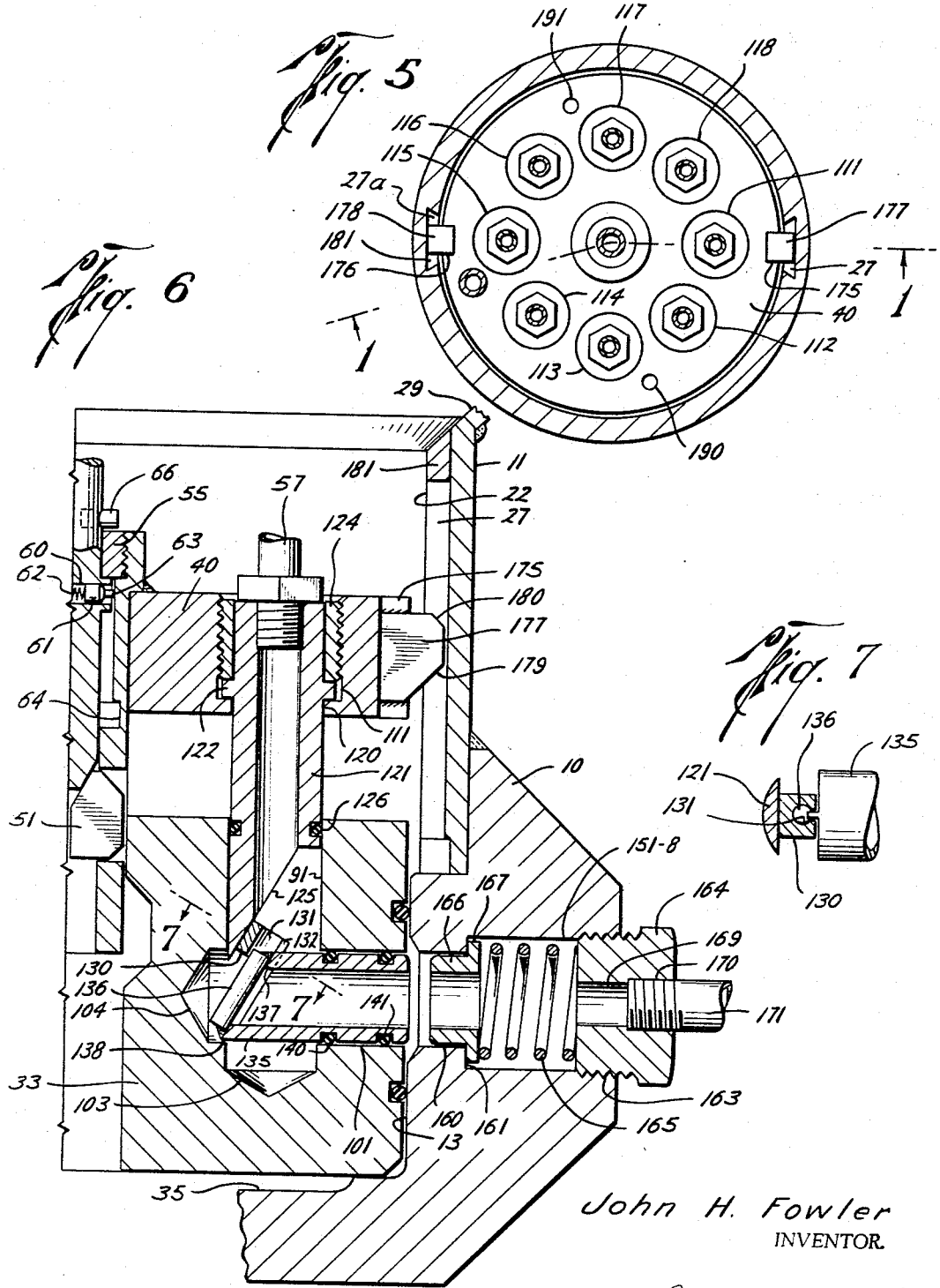

3,326,579
MULTIPLE CONDUIT CONNECTION
John H. Fowler, Houston, Tex., assignor, by mesne assignments, to Rockwell Manufacturing Company, Pittsburgh, Pa., a corporation of Delaware
Filed May 27, 1964, Ser. No. 370,482
7 Claims. (Cl. 285—10)

This invention pertains to apparatus for providing connections for multiple flow lines at remote locations, such as beneath the surface of a body of water. In addition, the invention provides for control of the equipment, such as, the operation of a valve or a plurality of valves at a remote location.

A principal object of the invention is to provide apparatus by use of which a plurality of flow conduits may be connected, disconnected, and operated at a remote location, such as at the bottom of a body of water.

Another object of the invention is to provide such apparatus which is reliable, economical and which can be operated by relatively unskilled operators.

A further object of the invention is to provide such apparatus which is dependable in use over extended periods of time without serving, or the like.

Briefly, the apparatus provided according to the invention includes a receptacle body disposed at the remote location, there being a plurality of flow lines connected into the receptacle body. An inserted member is manipulated into place into the receptacle body by suitable handling tools, proper manipulation of the joined bodies providing an automatic connection of each flow line connected to the receptacle body with a flow line extending to the inserted body. Adequate seals are provided at necessary locations in the apparatus so that the fluids flowing through the separate flow lines are maintained against intermixing, and so that ingress and egress from the equipment are avoided. Should it be desired to break the connections, a suitable handling tool may be employed to remove the inserted body from the receptacle body, thereby breaking the connections and making it possible to replace the inserted member or to change the flow lines leading thereto, for example, from the surface of a body of water.

When the inserted and receptacle bodies are adjoined together, there is no possibility that accidental disjoinder thereof will occur. The apparatus may be assembled at a remote location without use of divers or any special equipment.

The apparatus may be left in place and in operation over extended periods of time, for example, twenty or thirty years, and satisfactory operation may be maintained for even longer periods of time.

Other objects and advantages of the invention will appear from the following detailed description of preferred embodiment thereof, reference being made to the accompanying drawings, of which:

FIG. 1 is a vertical cross-sectional view of a preferred embodiment of the apparatus taken as indicated by line 1—1 of FIG. 5;

FIG. 2 is an enlarged plan view of a portion of the apparatus shown in FIG. 1, taken at line 2—2 of FIG. 1;

FIG. 3 is a vertical cross-section taken at line 3—3 of FIG. 2;

FIG. 4 is an enlarged vertical cross-section of a portion of the apparatus shown in FIG. 1, taken at line 4—4 of FIG. 1;

FIG. 5 is a horizontal cross-sectional view of the apparatus shown in FIG. 1, taken at line 5—5 of FIG. 1;

FIG. 6 is an enlarged vertical cross-sectional view of a portion of the apparatus shown in FIG. 1, showing the connection between inserted and receptacle body members in disconnected condition; and FIG. 7 is a partial cross-sectional view taken as indicated at line 7—7 of FIG. 6.

Referring now to the drawings in detail, and first to FIG. 1, the main receptacle body member is indicated by reference numeral 10.

This body member is extended upwardly by cylindrical sleeve 11 disposed with its lower end within recess 12 annularly formed around the upper end of the main body recess 13. As is indicated in the drawing, body member 10 has upwardly facing conically slanted side portion 14 and downwardly facing conically slanted side portion 15. The circular side wall of body member 10 is vertical between these side portions 14, 15. The bottom of body member 10 is covered and closed by cover plate 16 which is secured in place by bolts 17 each inserted through a perforation in plate 16 and received in one of the tapped openings 18 which are circularly spaced around the edge of the lower face of body member 10.

The apparatus may be located at any remote location, or, of course, may be located at a non-remote location and operated by hand. However, such equipment will most likely be most often used at remote locations where it may be joined and disconnected easily by suitable handling tools. In FIG. 1 of the drawings, the body member 10 is indicated as welded to a frame 19, 20 extending laterally from an underwater well assembly (not shown) in order to exemplify one possible use of the apparatus in a remote location beneath the surface of the ocean.

Sleeve 11 has an interior concentric cylindrical opening or passageway 22 therethrough. The upper end of passageway 22 is conically formed as at 23. The lower end of passageway 22 has therearound a recess enlargement 24. Sleeve 11 is welded into opening 12 at weld 25 therearound. Two aligning slots 27, 27a are shown disposed vertically along the inner wall of passageway 22. Any number of such aligning slots may be provided, as desired.

Body member 10 is further extended upwardly by upwardly divergent funnel member 29 welded around sleeve 11 at weld 30. The funnel is supported by a plurality of circularly spaced radially disposed ribs 31. The ribs 31 are preferably welded both to funnel member 29 and to sleeve 11. Funnel 29 cooperates with surface 23 at the upper end of sleeve 11 to provide a uniform guiding surface to direct movement of equipment into the opening of body member 10.

The main inserted body member is indicated by reference numeral 33. Body member 33 has a generally cylindrical form and is fairly closely received within opening 13. The lower end of opening 13 is relieved as at 35 except around its periphery. Body member 33 rests upon this unrelieved periphery at the lower end of opening 13. A pair of O-ring seals 37, 38 are each disposed in an annular groove around body 33. Each of these seals between body 33 and body 10. Another body 40, in the form of a flat cylindrical disc, is of the same diameter as cylindrical body member 33, and is disposed upon body 33 upon assembly of the connection. Bodies 33, 40 have aligned openings 42, 43, respectively, which form a uniform passage or bore through the assembled bodies. Bore 42 has enlargement 44 which is conical at both its upper and lower ends. A tube or sleeve 46 is enlarged adjacent its upper end and its lower portion is inserted downwardly through opening 43. The enlarged upper portion is welded to the upper surface of body 40 as shown. Tube 46 extends downwardly into bore 42 when body 40 is placed on top of body 33.

Tube 46 has an axial passage therethrough which is of reduced diameter below upwardly facing annular shoulder 47. Below shoulder 47, this passageway has a plurality of side openings 48, 49 within which latching lugs 50, 51 are disposed. The upper end of the passageway of member 46 is slightly enlarged and threaded at 54 to receive an outwardly threaded ring 55. Ring 55 encircles a shaft or stem 57 which extends from within the passageway of sleeve 46 upwardly. Stem 57 has enlargement 58 diametrically through which there is a cross passageway 60 within which is disposed a pair of spring biased stop lugs 61, only one being shown (see FIG. 6). A spring 62 is disposed under compression between these stop lugs. The stop lugs each have an outwardly extending pin portion 63 integrally formed therewith. Upon installation of the equipment the pin portions 63 are extended into a circular recess 64 surrounding the passageway of member 46. A shear pin 66 is disposed (as in FIG. 6) within a suitable perforation in the side of shaft or stem 57 and extends outwardly over ring 55 to hold the shaft in an upward position before assembly. The pin is sheared when shaft 57 is moved downwardly to engage pins 63 in recess 64 and to engage lugs 50, 51 in recess 44, body 40 having been moved to against body 33 before this is done. The unassembled condition is shown in FIG. 6 and the assembled condition is shown in FIG. 1 of the drawings.

A horizontally disposed flat cover plate 70 covers the upper end of funnel 29 when the equipment is assembled. Plate 70 has around its lower periphery a sealing ring or gasket 71 disposed in a suitable annular recess 72. Stem 57 extends upwardly through an opening at the center of plate 70, the opening being designated by reference numeral 74. The upper end of stem 57 is threaded at 78 for a distance sufficient to receive stop ring 79. Ring 79 is conical at its lower portion and is screwed onto threads 78 after placement of ring 55 about stem 57. Ring 79 abuts the lower surface of cover plate 70, as shown.

Plate 70 has upwardly extending sleeve formation 81 at its center into which is received the lower end of an overshot fixture 82 which has axial opening or bore 83 at its lower end which is screwed onto threads 78. Pin 84 is received in perforations of sleeve 81 and fixture 82 and extends through a groove diametrically across the upper end of shaft 57 so that the relative azimuthal positions of the fixture, shaft and elements connected to the shaft are fixed. Fixture 82 also has around its lower end an O-ring seal 85 disposed in a suitable annular groove therearound which provides a seal between fixture 82 and the interior of sleve 81. Fixture 82 has at its upper end radially outwardly extending formation 86 which is conical at 87 and which at its lower surface provides a downwardly facing shoulder 88.

Referring especially now to FIG. 6 of the drawings, and also to FIGS. 1 and 5, body 33 has a plurality of L-shaped passageways 91 therethrough. Any desired number of these L-shaped passageways may be provided, eight being provided in the apparatus shown in the drawings. The horizontal portion of each L-shaped passageway 91 is indicated in FIG. 6 by reference numeral 101. These passageways are formed by boring from the upper and lateral sides of body 33 as is indicated in the drawings. The two bores cross and form passageway extension 103 and 104. These are shown to be conical at their inner ends as a result of the boring operation by which they are formed. Body 40 has corresponding openings 111–118 each aligned above the vertical portion of one of the L-shaped passageways 91. Only opening or port 111 is completely shown in FIG. 6, the other being identical. Port 111 is threaded interiorly and has size reduction 120 at its lower end forming an upwardly facing shoulder. A vertical tube 121 is received in each of the openings 111–118, each of these having an exterior annular ring portion 122 the lower surface of which is seated on the shoulder at reduction 120. An exteriorly threaded retaining sleeve or ring 124 is screwed into the passage 111 to bear against the upper surface of formation 122.

An O-ring seal 126 is disposed in a groove encircling tube 121 to form a seal between the tube and the corresponding opening 91 of body 33 into which it is received. The lower end of tube 121 is beveled as at 125 partway across its diameter. Horizontal shoulder 126 is provided at the upper end of bevel 125, the shoulder 126 being shown to be equal to the wall thickness of tube 121. At the lower end of bevel 125, there is welded or otherwise secured thereto a boss 130 which has a cylindrical opening 131 therethrough in a direction parallel to the bevel 125, this opening having slot 132 therealong opening through the lower side of boss 130. This structure is best shown in FIG. 7 of the drawings.

A horizontal tube 135 is axially movably disposed within the horizontal part of each L-shaped passageway 91. The inner ends of the tubes 135 are beveled to correspond with the bevels 125. Welded to or otherwise affixed to the inner beveled ends of the tubes 135 is a cylindrical bar 136. The bars 136 are each welded or otherwise connected with upper and lower projection 137, 138 provided at the inner ends of the tubes 135. The cylindrical bores 131 are each of a size to freely axially movably receive one of the bars 136. Therefore, when the vertical tubes 121 are (simultaneously) moved upwardly or downwardly, the sliding connection between bores 131 and bars 136 imparts horizontal inward or outward movement to the tubes 135. Thus, when tubes 121 are moved from their positions shown in FIG. 6 downwardly to the positions shown in FIG. 1, the horizontal tubes 135 are moved outwardly to extend outwardly of body 33. The tubes 135 are each provided with two encircling O-ring seals 140, 141 disposed in suitable annular grooves therearound.

Body 10 has circularly spacedly arranged therearound a plurality of horizontal passageways 151, only one passageway 151 being shown in FIGS. 1 and 6. Eight such passageways are present in the apparatus shown in the drawings, but apparatus having more or less may be made. These passageways are each reduced at their inner ends at 160 to provide outwardly facing shoulders 161. Each of the passages 151 is located in alignment with one of the horizontal passages 101–108. When the tubes 135 are extended outwardly of body 33 as has been described, the outer ends of the tubes 135 are each caused to be extended into one of the passages 151. The outer O-ring seal 141 then provides a seal between the tube 135 and the reduced portion 160 of the passage 151. The outer end of each passage 151 is threaded as at 163. A spring retainer nut 164 is screwed into each of these. A helical compression spring 165 is compressively disposed between the inner face of each retainer nut 164 and the outwardly facing end of a flow connection washer 166. Washers 166 have flanges 167 around their outer ends which engage shoulders 161 when the washers are moved inwardly as far as possible. When the tubes 135 are radially extended outwardly from body 33, the outer tube ends push the flow washers 166 outward against bias of the springs 165. Each retainer nut 164 has therethrough an axial port 169 threaded at its outer end at 170 to receive the threaded end of a flow conduit 171, or the like.

Body 40 has oppositely disposed vertical slot 175, 176 within which are received and welded in place the aligning keys 177, 178, respectively. These keys each have a downwardly facing bevel 179 and an upwardly facing bevel 180. The horizontally outward ends of these keys are received movably within the vertical aligning slots 27, 27a. Keys 177, 178 serve to align body 40 upon its introduction into opening 22 of sleeve 11. The upper ends of the aligning slots 27, 27a are each flared as at 181 to simplify introduction of the keys 177, 178 thereinto. Below these flared portions, the aligning grooves are only slightly larger than the lateral key dimensions.

Referring now especially to FIG. 5 of the drawings, two flush ports 190, 191 are provided vertically through body 40. Ports (not shown) in vertical alignment with ports 190, 191 are also provided through body member 33. These are not shown in the drawings because their positions and form are entirely indiacted in FIG. 5 with respect to body 40 and showing thereof in FIGS. 1 and 6 would serve merely to confuse. When body 40 is positioned on top of body 33, these ports form continuous passages from above body 40 to below body 33, giving access to the space provided by relief 35 at the lower end of chamber 13. Referring now also to FIG. 1 of the drawings, a check valve 192 controls fluid flow through passage 193 through the lower end of body 10. A port 194 through plate 16 is in register therewith. When the equipment is in assembled condition as shown in FIG. 1, fluid may be introduced into space 195 within funnel 29 and below funnel cover 70 and this fluid may be forced downwardly through ports 190, 191 and the associated ports of body 43 into relief space 35 and out through check valve 192 and ports 193, 194. This serves to flush undesirable materials, such as saline materials resulting from salt water in which the equipment is situated, to prevent corrosion, and the like, of the equipment. The manner of introduction of the fluid into space 195 will be hereinafter described. Oil is generally preferred as the flushing fluid.

Referring now especially to FIGS. 1–3, a flow conduit connector body 196 is disposed through an opening 197 in funnel cover plate 70. Body 196 is of generally cylindrical form, the axis being vertical. Enlargment of the lower part of body 196 provides a shoulder 199 which abuts the lower side of plate 70 around opening 197. Body 196 has eight passages 201–204 and 205–208 downwardly therethrough. The upper end of body 196 is peripherally beveled at 210. The lower end of body 196 has peripheral bevel 211. Passages 201–204 are bored or otherwise formed vertical and straight down through the body. Passages 205–208 are angular as at 212 at their upper ends. At their lower ends, passages 205–208 have lateral outlet passages 213 extending from the vertical passage to the exterior of body 196. The angular passages 212 to terminate upwardly at surface 210. Four conduits, for example, hoses 221–224 have threaded end connections screwed into the threaded upper ends of passages 201–204. Similarly, conduits, such as hoses 225–228, have threaded end connections screwed into the threaded upper ends of the passages 205–208. These conduits 221–228 will usually extend from body 196 to the surface of the body of water in which the equipment is installed, but may otherwise extend to other equipment as necessary to the complete installation.

The lateral passages 213 from passages 205–208, only one being shown in the drawings and the others being identical, have threaded outer end portions into each of which may be screwed a threaded plug 230. The lower ends of all of the passages 201–208 are interiorly threaded. Conduits, such as hoses 231, 232, which have terminal threaded connections at their ends are screwed into the lower ends of all of the passages 201–208. When not in use, any of these passages may be closed by threaded plugs 230. Alternatively, the passages 205–208 may connect through their lateral outlets 213 instead at their lower ends, which would then be plugged, or alternatively again, conduit connections to both outlets of passages 205–208 may be made if desired.

The number of passages 201–208 may be as desired, more or less than the eight passages shown. The reference numeral 232 as here used collectively indicates in this case, seven conduits connected to the openings or passages 201–208 which are connected to the tubes 121. Conduit 231 is employed differently from these other conduits, as will be described. Body 196 has exterior threads 236 therearound above shoulder 199. A retainer ring 237, interiorly threaded, is screwed onto these threads above plate 70 and thereby secures body 196 to plate 170. Ring 237 has lower interior O-ring seal 238 which provides a seal between the ring 237, plate 70, and body 196. A vertical port 240 is provided downwardly at the axis of body 196 and has at its lower end a check valve 241, spring biased, and retained by threaded ported plug 242 which is screwed into the interiorly threaded lower enlargement 244 of port 240. Port 240 is interiorly threaded at its upper end for connection of a conduit 246, for example a rubber or plastic hose or pipe, through which the flushing fluid, previously described, may be introduced, the check valve 241 permitting entry of the flushing fluid to below cover 70 into space 195 from whence it flows downwardly through the equipment.

Referring now to FIGS. 1 and 4 of the drawings, a hydraulic sealing fluid cylinder body 250 is mounted atop plate 70. Body 250 has therewithin a smooth bore cylindrical opening 251 terminating downwardly at inwardly projecting flange 252 in which there is disposed an inwardly facing O-ring seal 253 in a suitable interior groove 254. The top of opening 251 is closed by a cover 256 having downwardly depending flange 257 having interior threads 258 screwed onto threads 259 around the upper end of body 250. The threads 259 are recessed by inward of the outer surface of body 250 so that the cover 256 and body 250 have aligned outer surfaces as shown. An O-ring seal 261 in a groove around the upper end of body 250 seals between cover 256 and the upper end of body 250. Body 250 is welded at 263 to cover 70 or otherwise rigidly and sealingly secured thereto. Cover 70 has an opening 265 into which the relieved lower end of body 250 partially extends as shown.

A piston 269 having around its upper end enlarged portion 270 is disposed within chamber opening 251. A seal between the cylinder wall and the piston flange 270 is provided by O-ring seal 271 disposed in groove 272 around the outer surface of piston flange portion 270. Therebelow the piston is reduced as at 275 and this reduced portion is slidably movable vertically within the interiorly facing part of flange 252 and sealed therewith by the O-ring seal 253. When piston 269 is moved upwardly, its upward movement is terminated by contact with the underside of cover 256. When piston 269 is moved downward, its downward movement is terminated by contact of enlargement 270 with flange 252. Two spaces or chambers within the hydraulic cylinder are provided, space 278 above the piston and beneath cover 256 and annular space 279 between the piston and cylinder above flange 252 and below piston enlargement 270.

Four ports or passages are provided through piston 269. The two passages 281 and 282 are best shown in FIG. 4 of the drawings, while the two passages 283, 284 are best shown in FIG. 1 of the drawings. Passage 281 is an inverted L-shaped passage, the horizontal portion being of smaller diameter. The horizontal portion of this passage provides an exit to space 279 just below piston enlargement 270. The lower end of passage 281 is interiorly threaded and has the threaded end connection of a conduit 285, such as a rubber hose or the like, screwed thereinto. Passage 282 is also an inverted L-shaped passage, its horizontal portion being of reduced diameter. The horizontal portion of passage 282 provides an exit to space 279 immediately below piston enlargement 270. At its lower end, passage 262 has two threaded counterbores 291, 292. A check valve 293, of the spring biased type, is screwed into counterbore 291 and permits only upward flow through passage 282. This check valve provides for filling of space 279 with a flowable plastic sealing material prior to installation of the apparatus at a remote inaccessible location, the sealing material being injected upwardly through port 282 past check valve 293 and into the space 279, this forcing piston 269 upwardly. After space 279 is filled with sealing material, the threaded plug 295 is screwed into threaded counterbore 292 to close the lower end of opening 282. Back pressure must, of course, be applied at passage 281 in order to fill space 279 with sealing material, and for this purpose a threaded plug (not shown) may be screwed into the threaded lower end of passage 281 to close it during filling. Thus, FIG. 4 represents the initial condition of cylinder 250 at the time of installation.

Referring now to FIG. 1, passages 283, 284 are vertical passages through piston 269, each having an interiorly threaded lower end for connection of a hose or other conduit. Hose 231 connected to the lower end of passage 201 of body 196 extends downwardly therefrom and then in U-form upwardly to be connected into the lower end of passage 284 as is shown in FIG. 1. Hydraulic pressuure is applied through conduiut 221, passage 201, conduit 231, passage 284, into space 278 above piston 269, across which space the hydrauluic fluid passes to passage 283 and therefrom downwardly through conduit 288 screwed at its upper end into the lower end of passage 283. Conduit 288, which may be a rubber hose or other suitable conduit, is connected at its lower end into the tapped upper end of the interior opening of one of the tubes 121. This vertical tube 121 connects as has been described with one of the horizontal tubes 135 to provide, together with all of the described connected systems, a hydraulic pressured fluid supply through one of the outlet conduits 171.

Conduit 285, previously described in connection with FIG. 4, extends downwardly from passage 281 to connection with coupling 290 at the upper end of pipe nipple 291, the lower end of which is screwed into interior threads at the upper end of L-shaped port 293, the lower end of which exits laterally from body 33 between O-ring seals 37, 38 therearound. This exit is at the relieved wall of chamber 13, previously described. Sealing material from reservoir space 279 is supplied through passage 281, conduit 285, pipe nipple 291, and port 293 into the annular space between O-ring seal 37, 38 which serves as a plastic sealing area annularly around body 33 within chamber 13. The pressured hydraulic fluid flowing through space 278 from port 284 to port 283 acts to drive piston 269 downwardly in chamber 251 thereby forcing sealing material from the space 279 outwardly through conduit 285. This system keeps the annular space around body 33 filled with sealing material at all times of operation of the equipment and thereby provides a high pressure fluid tight seal around all eight, or other number, of the horizontal tubes 135 which in installed condition extend across the abutment between body 33 and body 10. The O-ring seals 140, 141 are then at either side of this abutment to contain the sealing material therebetween at each horizontal tube 135.

Only one of the conduits 232 is shown in FIG. 1 of the drawings, but as has been before stated, there are in this embodiment of the equipment seven such conduits, each leading from one of the passages of body 196 to one of the vertical tubes 121 of bodies 40, 33. These conduits provide flow connections between the conduits 221–228 and the eight lateral outlet conduits or pipes 171 shown in FIGS. 1 and 6.

Referring now again to FIGS. 1 and 6, the lower end of shaft 57 is conically beveled at 300. This beveled surface is of the same taper as and is adapted to engage the surfaces 301, 302 of the latching lugs 50, 51, respectively. These latching lugs have the lower beveled surfaces 303, 304, respectively, of the same taper as the lower side of recess 44, and upper tapers 305, 306 of the same taper as the upper side of recess 44.

The assembly formed by body 10, sleeve 11, and funnel 29 will usually be mounted in a remote inaccessible location, such as beneath the surface of a body of water, upon the mounting frame members 19, 20 which may be, for example, a frame secured to one side of an underwater well. The lateral conduits 171 will extend to passageways or openings of the well, for fluid flow communication from the well equipment to surface. These assemblies will normally usually be made prior to or at the same time that the equipment is placed at the bottom. The frame 19, 20 will often be lowered to bottom with the assembly mounted on it at the same time that the wellhead or Christmas tree equipment is lowered to the well. Such equipment is exemplified by the arrangements shown in United States Letters Patent No. 3,086,590 issued Apr. 23, 1963. The upper and interior part of the apparatus disclosed herein is not at that time in place and the lower and outer assembly comprising heads 10, sleeve 11, and funnel 29 will be in the condition shown in FIG. 6 with the horizontal tubes 135 retracted and with the vertical tubes 121 not yet inserted into passages 91. The FIG. 6 showing, therefore, is of the equipment at the commencement of assembly thereof at the remote location.

Still referring primarily to FIGS. 1 and 6, overshot connection 82 having head 87 is engaged by a suitable handling tool (not shown). Through manipulation of the handling tool, and by means of guides of the type shown in the above referred to Letters Patent, the assembly of cover 70, heads 196 and 250, together with head 40 carrying the vertical tubes 121, and body member 33, is lowered into funnel 29 until the funnel cover 70 engages the top of the funnel. Body member 33 is supported by couplings 290 on nipples 291. During this entrance of the equipment into opening 195, the inserted assembly is rotated until aligning keys 177, 178 enter aligning slots 27, 27a, and then the assembly may be lowered to its lowermost position. The body member 33 stops first, and the element 40 continues down so that the tubes 121 push the horizontal tubes 135 outward against the washers 166 to compress springs 165. Thereafter, pressure through line 221 and conduit 231 entering space 278 causes flow of sealing material from space 279 to form the above described seal between O-ring seals 37, 38 and 140, 141. One of the conduits 171 will be a hydraulic fluid conduit to pressurize and operate valve actuators for the other conduits 171. This arrangement is fully described in the aforesaid Letters Patent No. 3,086,590 and is further clarified in United States Letters Patent No. 2,990,851, issued July 4, 1961, which are hereby incorporated in the disclosure in this case. In the latter Letters Patent, hydraulic pressure exerted through one conduit is used to operate the valves controlling flow through the other conduits. The hydraulic pressure may alternatively be used to actuate any desired additional equipment or alternative flow control means for the other conduits 171. The conduits 221–228 normally extend to surface. If the apparatus is not located beneath a water surface, the lines 221–228 may extend to any accessible and suitable operating location, as desired.

The engagement of shaft surface 300 with the bevels of latching lugs 50, 51 during installation of the inner equipment causes extension of the latching lugs from the retracted positions of FIG. 6 to the extended positions of FIG. 1. The latches engage in recess 44 to hold the equipment in assembled condition. The pins 63 enter recess 64, shear pin 66 being sheared during this assembly by a downward force exerted on overshot fitting 82.

The connection described may be broken by a simple upward pull on overshot fixture 82. In this case, the pins 63 (FIG. 6) are sheared thereby permitting stem 57 to move upwardly with respect to body 33. Body 40 is thus moved upwardly until its upper surface engages the bottom of coupling 290. This upward movement of body 40 and vertical tubes 121 causes withdrawal of horizontal tubes 135 from ports 160, and further upward movement of body 40 causes withdrawal of the interior portions of the apparatus until it is completely removed. In order for later reinsertion of the interior portions of the apparatus, the pin 66 must be replaced. Also, the pins 61, 63 must be replaced in retracted positions in the upper part of sleeve 46.

The described remote connection is very useful in the case of underwater wells, especially. It may also be used in any remote inaccessible locations. It may at times be found of use in accessible locations where it may be operated non-remotely. The connection is virtually foolproof in operation and is dependable.

While a preferred embodiment of the invention has been shown and described, many modifications thereof may be made by a person skilled in the art without departing from the spirit of the invention, and it is intended to protect by Letters Patent all forms of the invention falling within the scope of the following claims.

What is claimed is:

1. Plural conduit connection, comprising receptacle body means having an interior chamber opening at a side of said receptacle body means, insertable body means removably received within said interior chamber of said receptacle body means, said receptacle body means having a plurality of ports therethrough each extending from said interior chamber to the exterior of said receptacle body means, a first plurality of conduit means each connected to one of said ports at the exterior of said receptacle body means, said insertable body means having an L-shaped passageway therethorugh corresponding to each said port of said receptacle body means, first tubular means in one angular portion of each said passageway retractably partially extended from the passageway into the corresponding port, a second plurality of conduit means each connected to the other angular portion of one of said passageways, second tubular means axially movably disposed in said other angular portion, the facing ends of the two tubular means in each passageway having connection whereby axially inward movement of the second tubular means causes partial extension of the first tubular means, and axially outward movement of the second tubular means causes retraction of the first tubular means, and actuator means for simultaneously partially extending each said first tubular means from the passageway in which it is disposed into the corresponding port to connect said receptacle body and said insertable body together and to establish flow communications between each conduit of said first plurality of conduits with a conduit of said second plurality of conduits and for retracting each said first tubular means into the passageway in which it is disposed to disconnect said receptacle and insertable bodies and to break said flow connections.

2. Combination of claim 1, said actuator means including means engageable by a handling tool extending from a remote operating location whereby said plural conduit connection may be operated from said remote operating location.

3. Combination of claim 1, said connections between the facing ends of the two tubular means in each passageway each comprising angular rod means fixed to the inner end of one of the tubular means and angular slot means on the inner end of the other tubular means parallel with said angular rod means, said slot means being adapted to receive an end of said rod means and said rod means being slidable therein, whereby axial movement of one tubular means is imparted axially to the other tubular means.

4. Combination of claim 1, said actuator means comprising body means movably carried by said insertable body means and having a plurality of ports therethrough, each of said second tubular means in said other passageway portions being fixed through each said actuator means port and extending therefrom axially movably into the other passageway portion.

5. Combination of claim 1, including means for sealing around said first and second tubular means in said one and other passageway portions and in said receptacle body ports, and means for sealing around said insertable body in said receptacle body chamber, said last-named sealing means bridging the tubular means partially extended from said one passageway ends into said receptacle body ports.

6. Combination of claim 5, said receptacle body means including outwardly flared funnel means around the opening of said chamber for implementing entrance of said insertable body means into said chamber, means on said insertable body means and means on said receptacle body means for positioning said insertable body means in said chamber, cover means for said funnel means carried by said insertable body means, hydraulic cylinder means carried by said insertable body means serially disposed in one conduit of said second plurality of conduits, said hydraulic cylinder means including plastic sealant material reservoir means pressured by hydraulic pressure in said one conduit, said last-named sealing means comprising a pressured plastic sealing material seal surrounding said insertable body and bridging around said partially extended tubular means, sealant conduit means from said reservoir means to said last-named sealing means, a supply of plastic sealant material in said reservoir means, whereby plastic sealant material is supplied to said last-named sealing means.

7. Combination of claim 6, including inwardly spring-biased washer means in said receptacle body ports for assisting retraction of said tubular means into said one ends of said insertable body passageways.

References Cited

UNITED STATES PATENTS

| 739,793 | 9/1903 | Shourek | 285—136 X |
| 1,973,610 | 9/1934 | Connors | 285—137 X |
| 2,917,327 | 12/1959 | McDermott et al. | 285—136 X |
| 2,990,851 | 7/1961 | Jackson, et al. | 285—131 X |

FOREIGN PATENTS 1,010,723   11/1965   Great Britain.

CARL W. TOMLIN, *Primary Examiner.*

T. A. LISLE, *Assistant Examiner.*